UNITED STATES PATENT OFFICE 2,617,713

METHOD OF INHIBITING CORROSION OF STEEL BY ALKALI SOLUTIONS

George W. Ayers, Chicago, Erskine E. Harton, Evanston, and Louis R. Mazurk, Chicago, Ill., assignors to The Pure Oil Company, Chicago, Ill., a corporation of Ohio No Drawing. Application April 15, 1948, Serial No. 21,314

4 Claims. (Cl. 23—184)

The present invention relates to a method of reducing the corrosion of ferrous metals in equipment for the processing and handling of solutions containing large percentages of caustic alkali. Specifically, the invention embodies a method of inhibiting the corrosion of ferrous equipment used in the regeneration and boiling of alkali solutions containing large amounts of alkali solubility promoters and/or oxidation catalysts for the sweetening of hydrocarbon oils.

Experience in the sweetening of hydrocarbons with solutions containing large amounts of alkali has developed the fact that when the solution comes to be regenerated, it contains not only the alkali and the aqueous solvent therefor, but also various sulfur compounds, sometimes a small amount of dissolved oxygen, small amounts of extraneous matter, a solubility promoter and in some cases an oxidation catalyst, which is used for the sweetening operation. The boiling to which this solution is subjected in the regeneration operation subjects the ferrous equipment in which it is handled to conditions, such that severe corrosion thereof takes place and results in the formation of precipitates in the solution which render it colored and so dirty that it can become unusable.

Accordingly, it is a fundamental object of the present invention to provide a method of preventing the corrosion which takes place in the boiling of strong alkali solutions.

A second object of the invention is to provide a method of preventing corrosion of equipment used in the regeneration of alkali solutions which have been used in the treatment of hydrocarbons.

A further object of the invention is to provide a method of inhibiting the corrosion occurring upon the regeneration of alkali sweetening solutions and maintaining the solutions in clear, clean useful condition.

Other objects and advantages of the invention will in part be obvious and in part appear hereinafter.

The invention, accordingly, comprises the process involved in protecting ferrous equipment against corrosion by the addition to solutions treated therein of certain small amounts of alkali metal thiosulfates, which process includes the several steps to be described and the relation of one or more of such steps to each of the others thereof, which will be exemplified in the method hereinafter set forth and defined in the claims. We have found that the incorporation of alkali metal thiosulfates, such as sodium, potassium and lithium thiosulfates in caustic alkali treating solutions containing large amounts of caustic, extracted sulfur compounds and, optionally as the treating process may determine, various organic solubility promoters, or accelerators, prevent corrosion of ferrous equipment by the solution when it is aerated or steamed and boiled for regeneration and further prevent, to a considerable extent, the formation of color bodies and solid precipitates in the solution, which not only interfere with the usefulness thereof, but when developed to a certain degree can render the solution unusable.

The type of solution used in the alkali treating of hydrocarbons includes generally an aqueous solvent which may or may not contain an alcohol, 5 to 50 per cent of caustic alkali and, depending upon the treating process employed, up to about 3 per cent of organic catalytic agent, such as a hydroquinone, catechol, wood tars, aromatic quinone forming compounds, hydroquinone, naphthoquinone, and anthraquinone and derivatives of these quinones and quinone forming compounds which have been found useful as accelerators. The solution may also contain alkali metal phenolates, naphthenic acid salts and isobutyric acid salts which have the effect of improving the action of the extracting solution. Typical of the processes employing this type of solution in hydrocarbon treatments and also including operations for regeneration thereof are those described in United States Patents 2,292,636, of August 11, 1942, to Lawrence M. Henderson and George W. Ayers, Jr. and 2,297,621, of September 29, 1942, to Lawrence M. Henderson and George W. Ayers, Jr.

The use of various inorganic salts as inhibitors against corrosion in various systems has been disclosed in the prior art. Typical among the processes involving the use of various inorganic salts are those disclosed in the following United States Patents: 2,297,666, of September 29, 1942, to Aaron Wachter, sodium nitrite in oil pipe lines; 2,153,952, of April 11, 1939, to Alfred L. Bayes, sodium nitrate in antifreeze solutions; 2,135,160, of November 1, 1938, to Herman Beekhuis, sodium dichromate in ammonium nitrate systems.

The state of the art thus outlined emphasizes the fact that the inhibition of corrosion is an empirical phenomenon and particular situations create their own peculiar corrosion problems which require specific solutions. That is, the inhibition of corrosion in a given situation calls for a process custom-tailored to the problem. Although a given corrosion inhibitor may be known to be useful in a certain application, projection of that inhibitor into what may appear to be an analogous situation will frequently be unsound. Thus, sodium phosphate and sodium chromate, which are very well-known inorganic salt corrosion inhibitors, were found to be worse than useless in the corrosion problem solved in the instant case. Whereas alkali metal thiosulfates are found not only to be valuable as corrosion inhibitors in the regeneration of heavy caustic solutions, but also serve to keep the solution clear by inhibiting the formation of color bodies and insoluble precipitate. In the alkaline washing and sweetening of hydrocarbons, hydrogen sulfide finds its way into the solution, where it forms sodium sulfide which is a very corrosive material.

The applicability of the instant invention to the inhibition of corrosion of ferrous materials by caustic solutions containing various extraneous compounds will be better understood by reference to the following series of examples and table:

*Example 1.*—A solution corresponding to the type which might be on hand for regeneration after an extraction operation was made containing 20 per cent by weight of sodium hydroxide, 3 per cent of meta-thiocresol, 76 per cent of water and 1 per cent of sodium thiosulfate and tested for its corrosiveness on a low carbon steel by placing a strip of the clean metal in the solution and subjecting it to successive two-hour periods of boiling. The boiling temperature was approximately 230° F. Parallel tests were made with plain sodium hydroxide solution and with a solution containing sodium chromate for comparison with a known corrosion inhibitor. The corrosion rate was determined by weighing the sample after the test and converting its weight loss into a corrosion figure stated in inches of penetration per year. Results of a series of tests are tabulated below:

*Table I*

| Additive | Corrosion Rate—Inches per year, Two-hour periods of boiling | | | |
|---|---|---|---|---|
| | 1 | 2 | 3 | 4 |
| 1. None—20% NaOH solution | 0.25 | 0.25 | 0.16 | 0.09 |
| 2. $Na_2SO_3$ | 0.16 | 0.13 | 0.16 | |
| 3. $Na_2S_2O_4$ | 0.21 | 0.12 | 0.08 | |
| 4. $Na_2CrO_4.4H_2O$ | 0.03 | 0.01 | 0.01 | |
| 5. $Na_2S_2O_3.5H_2O$ | 0.08 | 0.18 | 0.05 | |
| 6. $Na_2SO_4$ | 0.20 | 0.11 | 0.15 | |

The composition of the solution in cases 2, 3, 4, 5 and 6 was:

| | Per cent |
|---|---|
| NaOH | 20 |
| m-Thiocresol | 3 |
| Additive | 1 |
| Water | 76 |

From the above table, it is clear that Test 1 employing plain sodium hydroxide solution showed some diminution in the rate of corrosion after 8 hours of boiling.

For the evaluation of results of this sort, it should be noted that the corrosion which takes place in the first two hours of the test would be most significant, for a steam regeneration operation, which the boiling simulates, could be completed within that period. Accordingly, the valuable inhibitor would be one which reduces the corrosion materially immediately.

Test No. 2 made with sodium sulfite indicates that the corrosion rate was lower than that of Test No. 1 but over the period of the test was not materially affected.

Test No. 3 made with sodium hydrosulfite showed a corrosion rate, lower than Test No. 1 and reduced over the period of the test, but results were somewhat less satisfactory than those with sodium thiosulfate, shown in Test 5, because of the development of a certain amount of color and precipitate in the regenerated solution.

Sodium chromate in Test No. 4 had the effect of reducing the corrosion to a marked extent, but, at the same time, appeared to accelerate the formation of color bodies and a heavy precipitate in the solution, so that its corrosion inhibiting value was more than canceled by the effect of developing color and precipitate in the solution. As a result, it can be considered that sodium chromate is relatively useless for the purpose.

Sodium thiosulfate in Test No. 5 had the effect of reducing the corrosion rate and the additional value of keeping the solution clear and relatively free of color.

Sodium sulfate, reported in Test No. 6, had no real value as a corrosion inhibitor.

Pilot tests of the corrosion inhibiting value of the thiosulfates conducted in large scale equipment used in the treating of gasoline-hydrocarbons indicated results corresponding to those obtained on the laboratory scale. These tests are an excellent indication of the effectiveness of the inhibitor because in normal alkali washing operations, a solution will pick up hydrogen sulfide which forms sodium sulfide, an extremely corrosive material. The results are summarized in Table II.

From the description of the process, it is clear that we have devised a way of avoiding corrosion of ferrous equipment by strong caustic solutions. Though specific examples given illustrate basically prevention of corrosion by solutions containing 20 per cent of caustic, we have found that 0.001 to 5 per cent of alkali metal thiosulfate is effective to prevent substantially all corrosion by caustic solutions in concentrations up to 50 per cent.

The process has been described in connection with the regeneration of solutions used in extraction treatment operations for hydrocarbons,

*Table II*

| Solution Tested | Additive | Corrosion Rate—Inches per year, Two-hour periods of boiling | | |
|---|---|---|---|---|
| | | 1 | 2 | 3 |
| 1. Partly Spent [1] 20% Caustic Soda Solution. | 0 | 0.22 | 0.15 | 0.07 |
| 2. Partly Spent [1] 20% Caustic Soda Solution. | 1% $Na_2S_2O_3.5H_2O$ | 0.0 | 0.0 | 0.0 |

[1] From washing gasoline in the refinery.

which entail vigorous steaming of the alkali solution to accomplish the regeneration. When an alkali treating solution is regenerated in such fashion, the equipment in which it is handled is subjected to the most extreme corrosion conditions. Where a solution has been made for the oxidative sweetening of hydrocarbons, such corrosive effect as it has on the ferrous equipment used in its regeneration can be minimized by means of the process described above.

Though specific illustrations of embodiments of the invention have been given, it is intended they be considered illustrative and not in a limiting sense for variation of the process can be practiced without departing from the spirit or scope thereof.

What is claimed is:

1. In the method of regenerating spent caustic alkali extraction solution wherein said regeneration is carried out at an elevated temperature which is substantially the boiling point of the solution, said solution having been employed in removing slightly acidic sulfur compounds from hydrocarbon mixtures and containing 5 to 50% by weight of a caustic alkali selected from the group consisting of the hydroxides of sodium and potassium, the protection of ferrous metal surfaces contacted by said solution by including therein as a corrosion inhibiting material an alkali metal thiosulfate in an amount between 0.001 to 5% by weight.

2. A method in accordance with claim 1 in which the corrosion inhibitor is sodium thiosulfate.

3. A method in accordance with claim 1 in which the corrosion inhibitor is potassium thiosulfate.

4. A method in accordance with claim 1 in which the corrosion inhibitor is lithium thiosulfate.

GEORGE W. AYERS.
ERSKINE E. HARTON.
LOUIS R. MAZURK.

REFERENCES CITED

The following references are of record in the file of this patent:

UNITED STATES PATENTS

| Number | Name | Date |
|---|---|---|
| 1,957,268 | Hiller | May 1, 1934 |
| 2,468,701 | Cauley | Apr. 26, 1949 |